J. FISK.
HARNESS.
No. 173,455. Patented Feb. 15, 1876.
2 Sheets—Sheet 2.
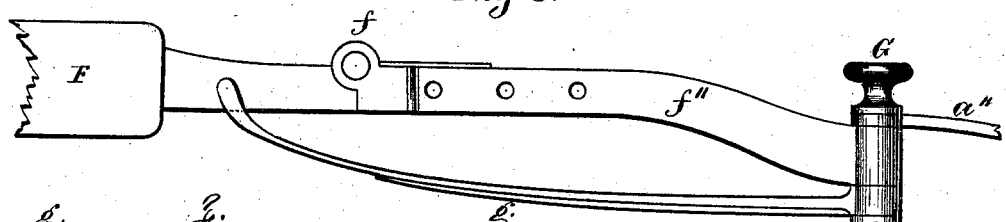
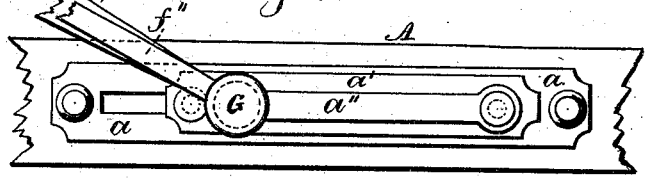
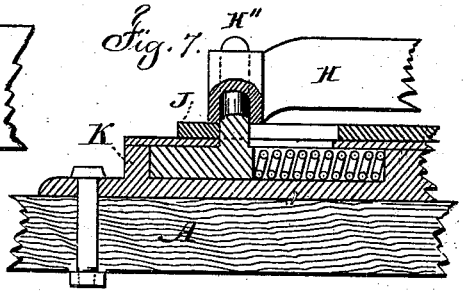
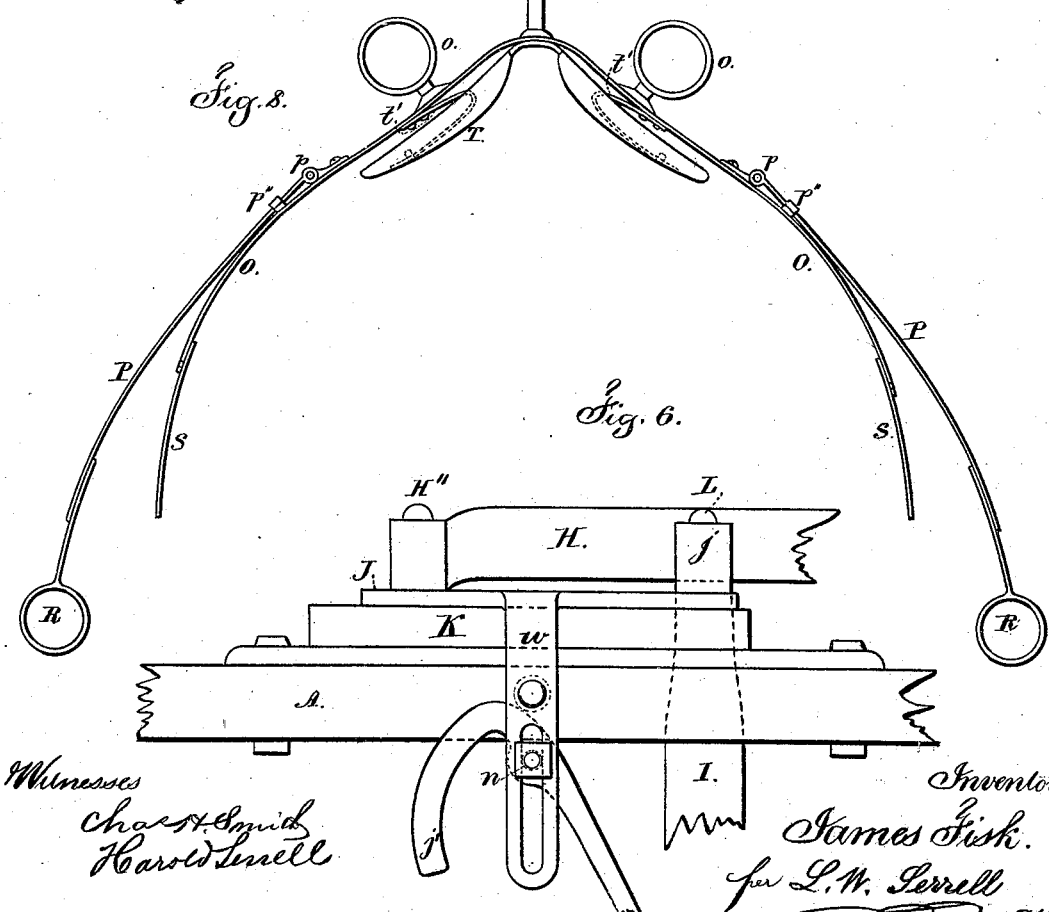
Witnesses
Chas. H. Smith
Harold Serrell
Inventor
James Fisk
per L. W. Serrell
atty

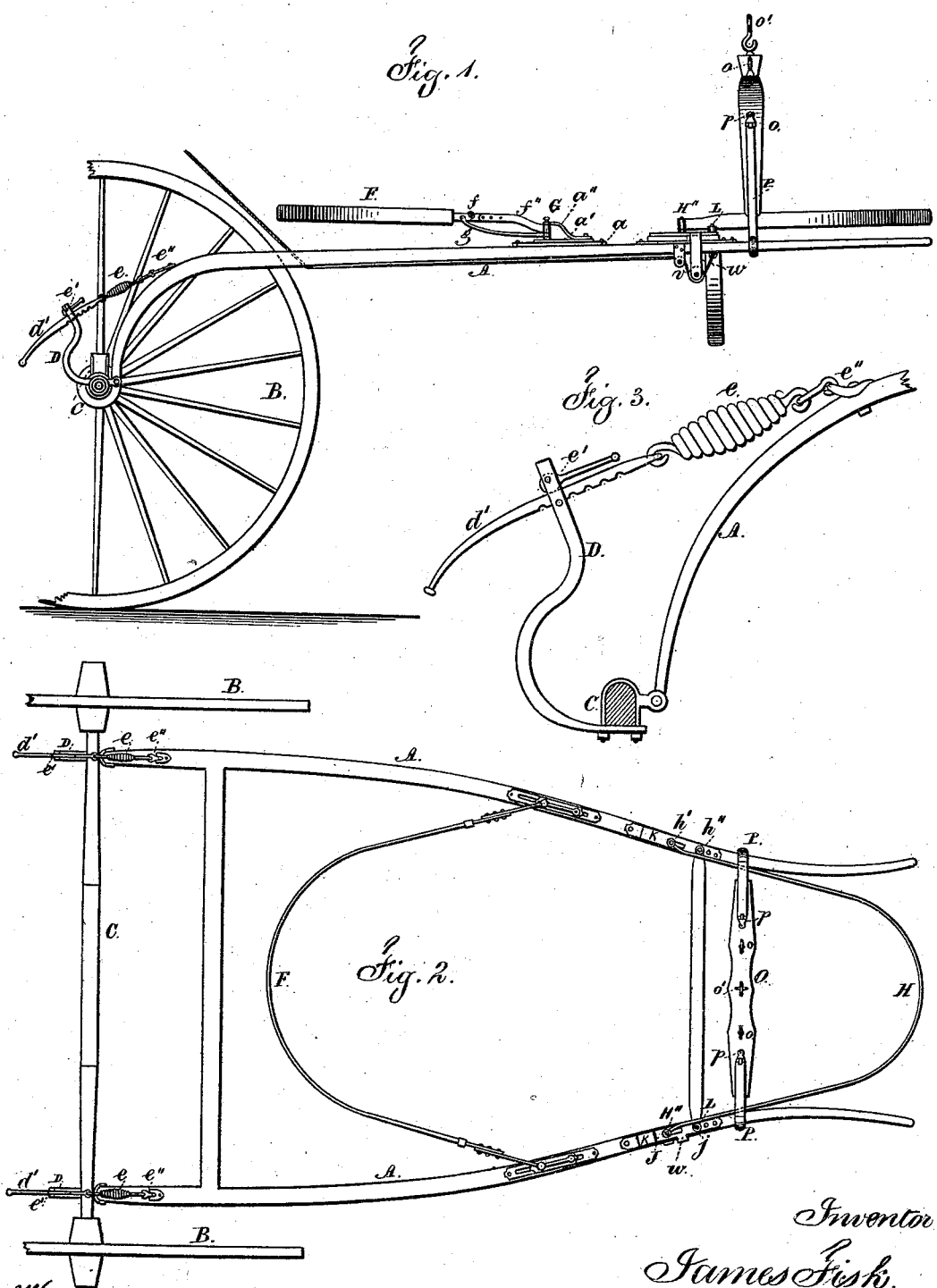

UNITED STATES PATENT OFFICE.

JAMES FISK, OF BRATTLEBOROUGH, VERMONT.

IMPROVEMENT IN HARNESS.

Specification forming part of Letters Patent No. 173,455, dated February 15, 1876; application filed January 21, 1876.

*To all whom it may concern:*

Be it known that I, JAMES FISK, of Brattleborough, in the State of Vermont, have invented an Improvement in Harness for Horses, of which the following is a specification:

I make use of springs that hold up the shafts or thills, so as to relieve the horse of their weight and lessen the weight of the harness upon the animal. The back-strap or breeching is attached to the thills permanently, but adjustably, so as to suit different horses. The saddle is provided with rings for the thills to pass through, and this saddle simply rests upon the animal's back. The draft-strap somewhat resembles the "Dutch collar," and it is fastened at one end; the other passes over a stud. The girth is also connected at one end, and at the other end there is an eye passing over a stud. There is a stripping-plate that is operated by a lever or cord, that lifts the collar-strap and girth-eyes off their respective studs, so that the horse can be disconnected instantly from the thills and allowed to run if he becomes unmanageable.

In the drawing, Figure 1 is a side view of the thills and the attachments. Fig. 2 is a plan of the same. Fig. 3 is a side view of the spring for holding up the thills. Fig. 4 is a plan, and Fig. 5 is a side view, of the holdback-strap and attachments. Fig. 6 is a side view, and Fig. 7 is a section, of the disconnecting devices for the draft-strap and girth; and Fig. 8 is an elevation of the saddle.

The front wheels B are upon the axle C, and the thills or shafts A are connected to the axle by clips, as usual. A spring, $e$, is applied to each thill. At one end of the spring it is connected, by an eye, $e''$, to the thill, and at the other end to a link, $d'$, that passes through a slotted arm, D, that extends up from the axle $c$. This link $d'$ has holes or notches for a pin that passes across the arm D, and in cases where the notches are used an eccentric, $e'$, presses the link upon the pin. By this means the tension of the spring can be adjusted and the thills held up with greater or less force, so that the animal is not only relieved of the weight of the thills and harness, but also partially supported in case he is disposed to stumble. The holdback or breeching strap F is connected at its ends to the thills, and for this purpose there is a plate, $a$, screwed to each thill, in which there is a longitudinal slot for the bolt G, that has a nut below said plate $a$, and this bolt passes through the block $a'$, arm $f''$, and brace $a''$. This construction allows the block $a'$ and bolt G to be moved back and forth in the slot in the plate $a$, and clamped firmly. This adjustment changes the position of the holdback to suit the size of the horse. The arms $f''$ are connected with the holdback-strap. There may be hinges at $f$ and springs $g$ to hold up this strap F, if desired, and there may be holes in the arms $f''$ and bolts to vary the length of the holdback.

The saddle $o$ is preferably of metal, with the check-rein hook $o'$, terrets $o\ o$, and spring side pieces $s\ s$, that grasp the sides of the animal, as it is preferable not to attach this saddle with a strap running around the horse. To the saddle $o$ the side pieces P are attached, preferably by joints $p$, with loops $p''$, and these side pieces P terminate with eyes R, through which the rounded ends of the thills pass. This saddle may remain upon the horse should he run away, as the shafts draw out of the eyes R when the animal is disconnected. The metal pad-plates T are connected at their upper ends to the saddle $o$, and between said pads and saddle there are springs $t'$, which allow said pads to yield. The strap H forms the draft or "Dutch collar," and the strap I forms the girth or belly-strap between the thills. The strap H is preferably connected at one end to the thill A by the bolt $h'$ in a slotted plate, so as to be adjustable, and at the other end this strap H is made with an eye, passing over the pin H''. When a spring is provided for the bolt $h'$ to move against, as hereafter described, the adjustment may be made in the strap H. The strap I has also at one end an attachment to the thill A, as at $h''$, where it may be lengthened or shortened. The other end of this strap has an eye, $j$, that passes over a pin, L. There is a vertically-moving plate, J, that forms a stripping-plate to cast the eyes of the straps H and I off their respective studs or pins H'' and L whenever a vertical motion is given to this plate J, and thereby liberate the horse to let him run if he cannot be controlled.

I have represented the cam-lever $j'$ on the pin or bolt $n$, as shown in Fig. 6, as a means for raising up this stripping-plate J. This lever is to have a cord or other suitable attachment passing back to the vehicle, so that the driver can pull the same and cast off the eyes of the straps H and I and let the animal go.

Pulleys might be used, as at $v\ v$, Fig. 1, to act upon the pendent slide-arm $w$ of the stripping-plate $j$ in place of the lever $j'$.

The pins or studs $h'$ and $H''$ may be upon horizontal bolts sliding in the cases K, and pressing against helical springs in such cases, as shown in Fig. 7, so as to make an easy movement of the vehicle and prevent sudden jar from the motion of the horse.

This construction of harness allows of great freedom of movement to the horse, and most of the parts can be of steel, and will wear for a great number of years, and they can be very ornamental in appearance.

I claim as my invention—

1. The springs $e$, arms D, and adjustable links $d'$, in combination with the thills A and axle C, as and for the purposes set forth.

2. The holdback-strap F, connected by the metal arms $f''$ to the bolts G, in combination with the adjustable blocks $a'$ and thills A, as set forth.

3. The metallic saddle $o$, pad-plates T, and rings R for the thills, substantially as specified.

4. The combination, with the collar-strap H and girth I, of the cast-off plate J, eyes and studs $H''$ and L, substantially as set forth Signed by me this 12th day of January, 1876.

JAMES FISK.

Witnesses:
  GEORGE W. HOOKE,
  H. A. KILBURN.